W. E. PORTER.
ELECTRICAL MEASURING INSTRUMENT.
APPLICATION FILED MAR. 18, 1915.
1,262,558.
Patented Apr. 9, 1918.
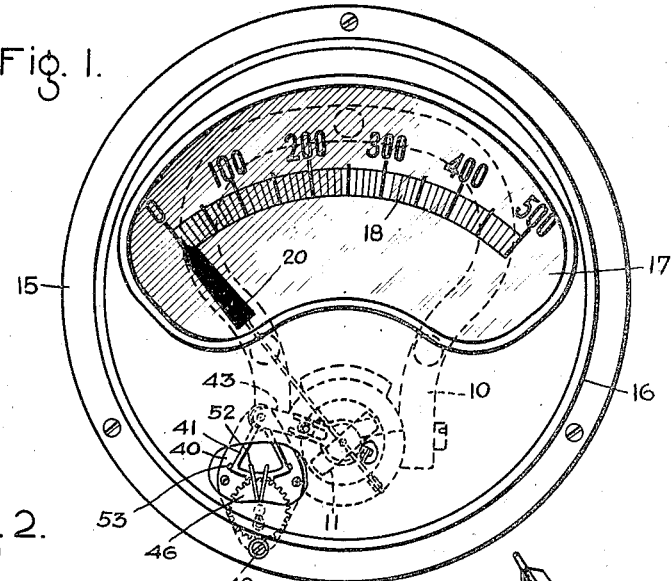
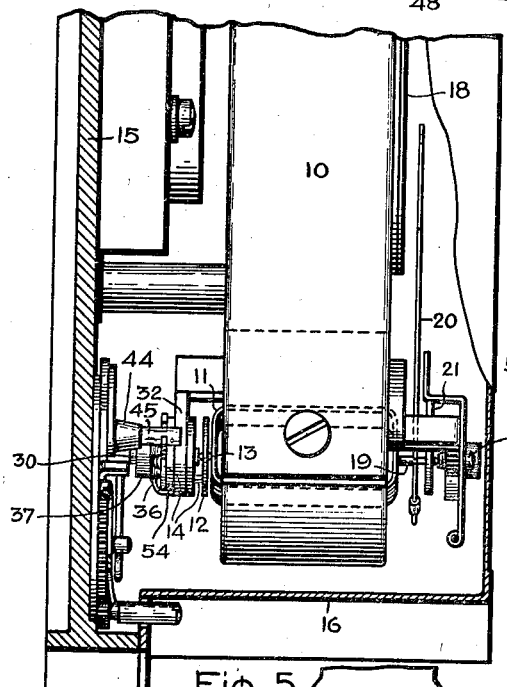
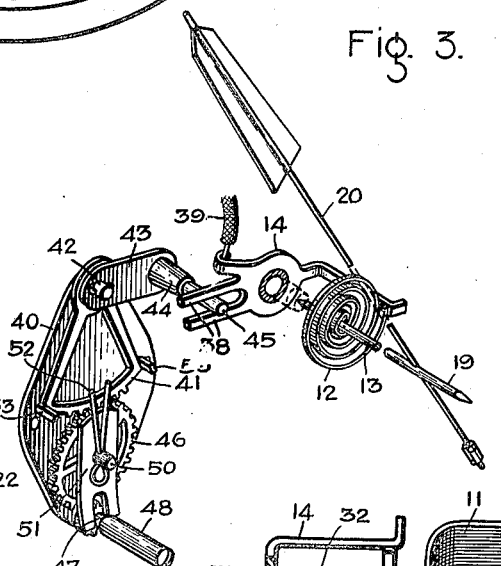
Witnesses:
Marcus L. Byng.
J. Ellis Glenn.
Inventor,
Willard E. Porter,
by Albert G. Davis
Att'y.

UNITED STATES PATENT OFFICE.

WILLARD E. PORTER, OF LYNN, MASSACHUSETTS, ASSIGNOR TO GENERAL ELECTRIC COMPANY, A CORPORATION OF NEW YORK.

ELECTRICAL MEASURING INSTRUMENT.

1,262,558.   Specification of Letters Patent.   Patented Apr. 9, 1918.

Application filed March 18, 1915. Serial No. 15,200.

*To all whom it may concern:*

Be it known that I, WILLARD E. PORTER, a citizen of the United States, residing at Lynn, county of Essex, State of Massachusetts, have invented certain new and useful Improvements in Electrical Measuring Instruments, of which the following is a specification.

My invention relates to electrical measuring instruments, and particularly to electrical measuring instruments having a movable element provided with a control spring. In such instruments the control spring is generally secured between a fixed part of the instrument and the movable element, and the zero or initial position of the movable element can be adjusted by adjusting the control spring, for example, by adjustment of the fixed end on the spring. The object of my invention is to provide a novel and improved adjusting means for the control spring of an electrical measuring instrument.

One of the desirable features of a device for adjusting or shifting the zero position of the movable element of an electrical measuring instrument is that the adjusting member, for example a screw having a slotted head for a screw driver, can be turned continuously in either direction without damaging the instrument, and further that such continuous turning of the adjusting member does not operate to interrupt the operative engagement between the various elements of the device. Another object of my invention is then to provide a novel and improved zero adjusting device for an electrical instrument in which the adjusting member can be continuously turned without damaging the instrument, and further without interrupting the operative engagement between the elements of the device. Another desirable feature of a zero adjusting device is that the mechanism thereof be remotely positioned with respect to the movable element of the instrument, so that undue pressure brought to bear upon the adjusting member cannot damage the instrument, as, for example, by locking the pivots. A further object of my invention is, therefore, to provide an adjusting device in which the adjusting member is conveniently located and easily accessible from without the casing of the instrument, and in which the mechanism of the device is sufficiently remote from the moving element of the instrument to prevent any damage to the instrument by abnormally rough usage of the adjusting member. These and other objects of my invention will be understood by those skilled in the art from the following description.

The novel features which I believe to be patentably characteristic of my invention are definitely indicated in the claims appended hereto. The construction and operation of an adjusting device for an electrical measuring instrument embodying the principles of my present invention will be understood from the following description taken in connection with the accompanying drawings, in which;

Figure 1 is a top view of an electrical measuring instrument embodying my invention; Fig. 2 is an elevation partly in section of a part of the instrument; Fig. 3 is a perspective view of the adjusting device; Fig 4 is a detail sectional view along the line 4—4 of Fig. 5; and Fig. 5 is a detail view of the end of the lower pivot support of the instrument.

I have illustrated my invention in the accompanying drawings in connection with an electrical measuring instrument of the D'Arsonval type. It will of course be understood that I do not wish to limit myself to this particular type of instrument, since the invention is adapted to be embodied in any electrical measuring instrument having a movable element provided with a control spring. The instrument illustrated in the drawings comprises a permanent magnet 10 of well known design. This magnet is provided with the usual pole pieces and a coöperating magnetic core of well known construction. The moving element of the instrument comprises a current carrying coil 11 mounted upon a suitable support and provided with a spiral control spring 12. The control spring 12 is secured at one end to a short shaft 13 and at the other end to a pivotally mounted lever 14, to be described in detail hereinafter. The moving element is provided with two shafts 13 and 19, one at each end of the coil 11, these shafts carrying the usual pivot points for the moving element. The operative elements of the instrument are mounted in the usual manner upon a supporting base 15, and are inclosed by a cover 16 having a glass window 17 adapted to expose to view the scale 18.

An indicating needle or pointer 20 adapted to sweep across the scale 18 is secured to the upper shaft 19 of the moving element in the well understood manner. This shaft is provided with a control spring 21 of the usual construction. A screw 22 carries the usual jewel for the pivot of the shaft 19. It will thus be evident that the upper end of the moving element is of the usual construction.

A bolt 30 is screwed into a bushing 31 carried by a fixed part 32 of the instrument. At its inner or upper end the bolt 30 carries a jewel of the usual type for the pivot at the end of the shaft 13. The bushing 31 is separated from the part 32 by washers 33 of insulating material. A washer 34 is threaded on the end of the bushing 31 to firmly secure the bushing and the insulating washers to the part 32. The bushing has a circular hub upon which is pivotally mounted the lever 14. The lever is firmly held in position against the bushing by means of a spring washer 36 and a nut 37. It will thus be evident that the lever 14 is insulatively mounted upon the fixed part 32 of the instrument. The spring washer 36 has an elongated member 54 bent for insertion in a recess in the periphery of the bushing 31, as indicated in Figs. 2 and 5 of the drawings. This construction prevents turning of the spring washer.

One end of the lever 14 is secured to one end of the control spring 12, while the other end of the lever is bifurcated, as indicated at 38 in the drawings. A current conductor 39 is electrically connected to the lever 14 and is adapted to conduct the electric current to be measured to or from the coil 11 of the moving element.

A diamond shaped plate 40 is mounted on the supporting base 15 of the instrument, and carries the operating mechanism of my novel adjusting device. A sector-shaped gear or rack 41 is pivotally mounted on a pin 42 at the upper end of this plate. An arm 43 is similarly mounted on the pin 42 and is secured to the sector-shaped gear 41, so that movement of the gear moves the arm. A boss 44 is secured to the arm 43 and has projecting therefrom a finger 45 of insulating material, such as a glass rod. The finger 45 is positioned between the bifurcated members of the lever 14, as clearly indicated in Figs. 3 and 4 of the drawings.

A gear member 46 meshes with the sector-shaped gear 41, and is adapted to be driven by a pinion 47, which in turn is rotated by an adjusting member 48, having a slotted head for the accommodation of a screw driver. The adjusting member 48 and the pinion 47 are operatively mounted upon the base 15 of the instrument. The adjusting member extends through an opening in the flange of the cover 16, and does not interfere with the convenient removal of the cover. The gear member 46 is mounted on a stationary shaft 50 and is held in position on the shaft by a washer 51 and a cotter pin 52. The washer 51 has a bifurcated end embracing the adjusting member 48 to prevent turning of the washer. The ends of the cotter pin 52 are so bent that they engage lugs 53 on the sector-shaped gear when the gear member 46 has been turned until it engages the end tooth, at one end or the other as the case may be, of the sector-shaped gear. The angle of motion of the arm 43 is limited by the extent of the toothed portion of the sector 41. Under ordinary conditions the sector-shaped gear would go out of mesh with the gear member 46 if the gear member were turned too far in either direction, and reversing the rotation of the gear member 46 would fail to bring the gear sections into mesh. In accordance with my novel construction, one or the other of the projections 53 engages one or the other of the spring arms of the cotter pin 52 just at the point where the teeth of the sector-shaped gear go out of mesh with the teeth of the gear member 46. The resiliency of the cotter pin tends to maintain the sector-shaped gear and the gear member in mesh, and when the direction of rotation of the adjusting member 48 is reversed, the sector-shaped gear will be in operative engagement with the gear member.

It will be evident from the foregoing description that turning of the adjusting member 48 adjusts the position of the control spring 12, and hence adjusts or shifts the zero or initial position of the moving or movable element of the instrument. The adjusting member 48 can be continuously rotated in either direction without damaging the instrument, since movement of the arm 43 is limited by the length of the toothed portion of the sector-shaped gear. The resilient ends of the cotter pin, however, tend to maintain the sector-shaped gear and the gear member 46 in mesh when the gear member engages either end tooth of the sector-shaped gear, and hence the continuous rotation of the adjusting member does not interfere with the operation of the device when the direction of rotation of the adjusting member is reversed. It will further be observed that the operating mechanism of the adjusting device is so removed from the moving element of the instrument that no damage can result to the moving element from unusually rough usage of the adjusting member. It will be evident to those skilled in the art that the principle of my present device may be embodied in a great variety of different constructions without departing from the spirit of my invention. In this connection I wish to point out that the principle of the device makes it desirable to have the sector-shaped gear somewhat loosely mounted so that a comparatively light spring will keep it in mesh with the gear member 46. In the embodiment of my invention illustrated in the accompanying drawing this is accomplished by the slight play between the finger 45 and the bifurcated end of the lever 14.

I have explained my invention by illustrating and describing a certain specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. In an electrical measuring instrument, a movable element, a control spring for said element, a movable member operatively related to said control spring and having a definite path of movement, rotatable means for moving said member to adjust said control spring, and means whereby said rotatable means can be continuously rotated in one direction when said member is in one or the other of the two extreme positions of its path of movement without altering the position of the member and without interrupting the operative engagement between said rotatable means and the member.

2. In an electrical measuring instrument, a movable element, a control spring for said element, a sector-shaped gear operatively related to said control spring, a gear member meshing with said sector-shaped gear, means for turning said gear member, and means whereby said gear member may be continuously turned in either direction without interrupting the operative engagement between said sector-shaped gear and said gear member.

3. In an electrical measuring instrument, a movable element, a control spring for said element, a movable member operatively related to said control spring, rotatable means including intermeshing gear members for moving said movable member to adjust said control spring, and means whereby said rotatable means may be continuously rotated in either direction without causing said movable member to move beyond certain definite limits and without interrupting the operative engagement between said gear members.

4. In an electrical measuring instrument, a movable element, a control spring for said element, a movable member operatively related to said control spring and having a definite path of movement, rotatable means for moving said movable member to adjust said control spring, said movable member and said rotatable means being so operatively connected that when the movable member is in one or the other of the two extreme positions of its path of movement said means can be continuously rotated in one direction without altering the position of the member, and resilient means tending to maintain said movable member and said rotatable means in operative engagement.

5. In an electrical measuring instrument, a movable element, a control spring for said element, a lever secured at one end to one end of said control spring and bifurcated at its other end, an arm having a finger operatively positioned in the bifurcated end of said lever, means including a rotatable member for moving said arm to adjust said control spring, and means whereby said rotatable member can be continuously rotated in one direction when said arm is in one or the other of its two extreme positions without altering the position of said lever and without interrupting the operative engagement between said last mentioned means and said arm.

6. In an electrical measuring instrument, a movable element, a control spring for said element, a lever operatively secured at one end to said spring and insulatively mounted in said instrument, a finger of insulating material operatively related to said lever, a sector-shaped gear operatively connected to said finger and having a pair of spaced projections secured thereto, a gear member meshing with said sector-shaped gear, means for turning said gear member, and a resilient member adapted to engage one or the other of said projections when said gear member engages one or the other of the end teeth of said sector-shaped gear thereby preventing unmeshing of said sector-shaped gear and said gear member when the gear member has been turned until it engages the end teeth of the sector-shaped gear.

7. In an electrical measuring instrument, a movable element, a control spring for said element, an insulatively mounted lever operatively secured to one end of said control spring, an arm having a finger of insulating material in engagement with said lever, a sector-shaped gear operatively connected to said arm, a gear member meshing with said sector-shaped gear, means for turning said gear member, and resilient means coöperating with said sector-shaped gear tending to prevent unmeshing of said sector-shaped gear and said gear member when the gear member has been turned until it engages the end teeth of the sector-shaped gear.

8. In an electrical measuring instrument, a movable element having a current carrying coil, a control spring for said element, an insulatively mounted lever secured at one end to one end of said control spring and bifurcated at its other end, an electrical conductor secured to said lever for conducting the electric current to be measured to or from said coil, an arm having a finger of insulating material operatively positioned in the bifurcated end of said lever, a sector-shaped gear operatively connected to said arm, a gear member meshing with said sector-shaped gear, means for turning said gear member, and resilient means coöperating with said sector-shaped gear tending to prevent unmeshing of said sector-shaped gear and said gear member when the gear member has been turned until it engages the end tooth at either end of the sector-shaped gear.

In witness whereof, I have hereunto set my hand this 15th day of March, 1915.

WILLARD E. PORTER.

Witnesses:
JOHN A. McMANUS, Jr.,
JOHN F. DRISCOLL.